Jan. 11, 1927.
J. BERGE
1,613,921
CROWN FOR SCREW HEADS AND THE LIKE
Filed April 18, 1925
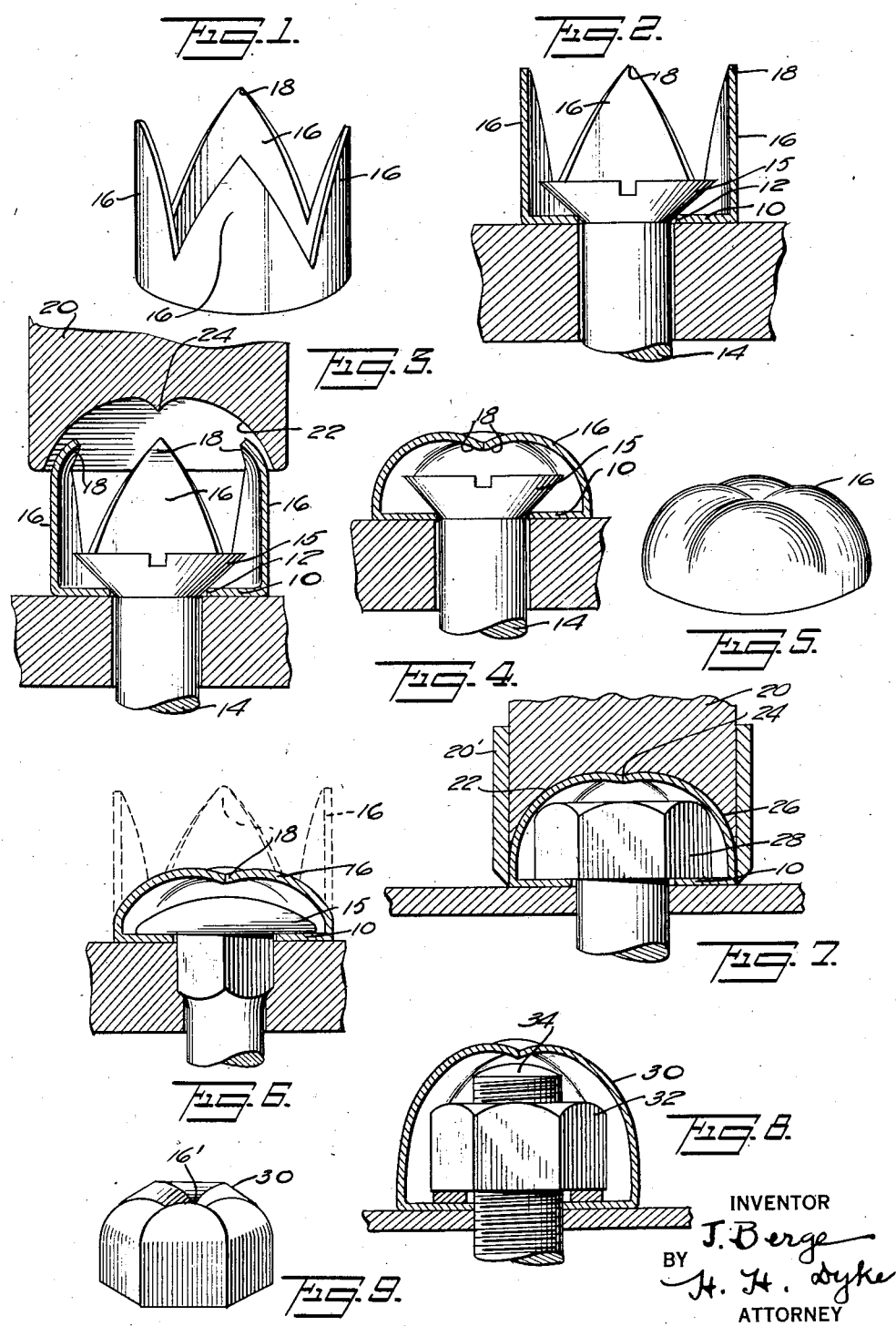
INVENTOR
J. Berge
BY
H. H. Dyke
ATTORNEY Patented Jan. 11, 1927.

1,613,921

UNITED STATES PATENT OFFICE.

JOSEPH BERGE, OF MONTCLAIR, NEW JERSEY.

CROWN FOR SCREW HEADS AND THE LIKE.

Application filed April 18, 1925. Serial No. 24,118.

My invention is of a head, cover or crown for fasteners, such as screws, bolts, nuts, nails and the like. The device as supplied for sale comprises a base or washer portion with a hole in it, through which hole the shank of a nail, screw or other fastener passes, and a plurality of upwardly or outwardly projecting portions extending up or out in somewhat the fashion of the petals of an open flower.

After the fastener is applied, as, for example, if the fastener is a screw, after the screw is passed through the hole in the washer portion and is screwed all the way into the board, panel or other object in which it is to be received, these projecting portions are then forced inwardly and downwardly in a fashion somewhat the reverse of a flower opening from the bud, and form a crown or cover over the fastener head. Thus the screw or other fastener head is covered and concealed by inturned parts of the same washer or piece of metal that was placed under the head before the fastener was applied. The device is preferably made of sheet metal, and may have practically any finish, such distortion as takes place in bringing the cover parts down and together not being enough to damage the finish.

In the drawings, Fig. 1 is a perspective view of a simple form of crown or cover in accordance with my invention as supplied to the trade. Fig. 2 is a cross-section of the same applied to a wood screw in place in a board, prior to closing on inturning. Fig. 3 is a section showing the commencement of the closing operation and showing the closing tool in section. Fig. 4 is a cross-section showing the closing operation completed and the crown or cover in its final form. Fig. 5 is a perspective of a cover which has been applied and closed in the manner indicated in Figs. 3 and 4. Fig. 6 is a sectional view showing a cover applied to a flat head bolt, the final positions of the prong portions being indicated in dotted lines. Fig. 7 is a cross-section of a cover applied to a hexagon bolt head. Fig. 8 is a similar view of a cover applied to the nut end of a bolt. Fig. 9 is a view similar to Fig. 5, but showing a deeper cover similar to that of Fig. 8 and provided with six prong or petal portions instead of four.

The device of my invention in its simplest form is initially in the form of a perforated cup having a petalled or toothed skirt and comprises the base or washer portion 10 provided with the central hole 12 for the passage of the shank 14 of the screw, bolt, nail or the like. The base 10 is preferably a flat washer to lie close to the surface on which applied and the size of the opening 12 is so proportioned for the particular fastener that the head 15 of the fastener when in place holds said base portion down flat upon the surface so that it will serve all the functions of an ordinary washer and will not rattle around or get loose. Around the periphery of base or washer portion 10 a number of projecting portions 16 are provided, which are integral with the material of base or washer 10 and are preferably formed as a part thereof by being struck up from sheet metal, such as sheet brass, iron and the like.

Considerable variation is permissible in the shape or form of such projecting prong or petal portions, but they are of such form and proportions that when brought together inwardly and downwardly, preferably by means of a suitable punch or closing tool provided for the purpose, they are closed together, the ends 18 of the prong portions preferably meeting in the center. The points or ends 18 are first turned in upon application of the tool and by application of one or more blows on the closing punch they are followed in by the wider and stiffer parts of the prong or petal portions until all the parts are closed to form substantially a canopy over the fastener head.

By providing the closing tool 20 of the form shown in Figs. 3 and 7 with the rounded or flow portions 22 and the center prick or point 24, the form of the closed cover will be as shown in Figs. 4, 5 and 6 or 7. When so closed with the tool as shown and described, the cover has the appearance of a dented multipart dome, the points of the prong or petal portions being turned in so as to make sure that their points will not catch on clothing, etc. To prevent a bulge at the base it may be necessary in some metals to use a ring 20' circumscribing the punch. This ring prevents production of any bulge at time of closing over.

In Fig. 7 I have shown a somewhat higher cover than in the preceding figures, said cover 26 serving to enclose the head 28 of a machine bolt. In Fig. 8 I have shown a still higher cover 30 designed to enclose the nut end of a bolt, including a nut 32 and a threaded bolt end 34.

While four or even a lesser number of the prong or petal portions is a sufficient number for all practical purposes, I may, if desired, divide the projecting portion of the cover into additional prong portions, and in Fig. 9 I have shown a higher cover 30 such as illustrated in Fig. 8 and provided with six of the prong portions 16'. This form of cover is particularly well adapted to hexagon bolt heads, nuts, etc.

It will be seen that the cover of my invention is extremely cheap, easily constructed and readily applied; that when applied it is firmly held in place, and when the prongs or petals are closed together after the fastener is in place, a very pleasing and attractive effect is secured, and the fastener cannot be tampered with or removed without prying apart the closed together prongs of the cover, thereby immediately revealing any tampering with a device comprising a fastener equipped with such head cover. The fasteners made use of may be of any inexpensive construction and the appearance of the fasteners is altogether unimportant, since they are completely covered and their unsightliness concealed after they are applied.

The device completely eliminates the unusual care required in the application of exposed head fasteners, such as the expensive French or oval headed screws and countersunk washer, for example. The need for the usual washer is eliminated, my device supplying the washer and head cover in a single piece or part.

The formation and finish can be varied to an indefinitely great extent and antique effects and the appearance of great strength can be readily and inexpensively obtained.

It is to be understood that the form shown herein is for illustration only and for affording an understanding of the invention and not for imposing limitations thereon, the scope of my invention being as defined by my claims by which I intend to claim all that is novel in view of the prior art.

I claim:

1. The process of concealing a fastener head, which comprises inserting under the head a washer having a plurality of pointed parts projecting beyond the head, and forming the projecting pointed parts of the washer into a cover concealing the fastener head.

2. The process of concealing a fastener head, which comprises inserting under the head a perforated sheet metal washer having a plurality of petal-like parts projecting beyond the head, and bending or turning over said projecting parts toward one another, whereby substantially a canopy covering is formed over the head of the fastener.

3. A cover for a fastener head, nut or the like, comprising a perforated washer through which the fastener shank is passed and inserted under the head or nut, a plurality of sharp pointed prongs projecting from the washer beyond the head, said prongs being bent or turned inwardly and downwardly to form a cover for the fastener head or nut with the sharp pointed prong portions converging together to meet in substantially the center of a dome shaped covering or canopy, over the fastener head.

In testimony whereof, I have signed my name hereto.

JOSEPH BERGE.